United States Patent [19]
Mitsuoka et al.

[11] Patent Number: 5,189,614
[45] Date of Patent: Feb. 23, 1993

[54] VEHICLE SHOCK ABSORBING SYSTEM

[75] Inventors: Hiroshi Mitsuoka; Kouji Hirao, both of Aichi, Japan

[73] Assignee: Aisin Seiki K.K., Kariya, Japan

[21] Appl. No.: 549,037

[22] Filed: Jul. 6, 1990

[30] Foreign Application Priority Data

Jul. 6, 1989 [JP] Japan .................. 1-175291

[51] Int. Cl.$^5$ .............................................. B60G 17/00
[52] U.S. Cl. ............................ 364/424.05; 280/707; 280/840
[58] Field of Search ............... 364/424.05; 280/707, 280/840

[56] References Cited

U.S. PATENT DOCUMENTS

| | | | |
|---|---|---|---|
| 4,744,589 | 5/1988 | Buma et al. | 280/707 |
| 4,747,615 | 5/1988 | Yamamoto | 280/707 |
| 4,856,815 | 8/1989 | Tanaka et al. | 280/707 |
| 4,948,166 | 8/1990 | Kaneko | 280/707 |
| 4,984,820 | 1/1991 | Uchiyama et al. | 364/424.05 |

FOREIGN PATENT DOCUMENTS

64-21237 1/1989 Japan .

*Primary Examiner*—Gary Chin
*Attorney, Agent, or Firm*—Sughrue, Mion, Zinn, Macpeak & Seas

[57] ABSTRACT

A vehicle shock absorbing system includes a plurality of shock absorbers each having at least three control conditions. A shock sensor is associated with each absorber for detecting a shock applied to the vehicle and providing a signal indicative of the shock to a calculator which calculates an extreme value having a maximum value and a minimum value. First, second and third shock operator circuits are provided for selecting conditions for each absorber.

10 Claims, 6 Drawing Sheets

VEHICLE SHOCK ABSORBING SYSTEM

BACKGROUND OF THE INVENTION

The present invention relates generally to a shock absorbing system and more specifically, the present invention is concerned with a variable controlled shock absorbing system for preventing a long damping or shock absorbing period in a vehicle.

A conventional vehicle is equipped with a shock absorbing system in which a shock absorber is arranged between a vehicle body and a wheel. In order to prevent an uncomfortable riding feeling or instability due to vehicle vibration, such a shock absorber has a two stage damping or shock absorbing control system.

Such a shock absorbing system is disclosed in Japanese Kokai No. 64(1989)-21237, wherein the shock absorbing system is exchangeable between two states, a HARD mode and a SOFT mode. The shock absorbing system has piezo type load sensors for detecting the road condition which is used as a control parameter in the shock absorbing system.

However, it is difficult for the shock absorbing system to provide an ideal control. The reason is that the controlled condition of the shock absorber will be selected in accordance with the control parameter of the load sensor. Therefore, the absorbing operation is only produced between two stages.

SUMMARY OF THE INVENTION

Accordingly, it is one of the primary objects of the present invention to provide a quick absorbing system for a vehicle shock absorbing system.

It is another object of the present invention to produce a highly stabilized shock absorbing system for a vehicle.

It is a still further object of this invention to produce a shock absorbing system to obviate the above drawbacks.

To achieve the above objects, and in accordance with the principles of the invention as embodied and broadly described herein, a vehicle shock absorbing system for controlling the absorbing of shocks to a vehicle comprises absorbing control means arranged between a vehicle body and a wheel, said absorbing control means having at least three stages in a control condition, shock sensing means for detecting a shock value to said vehicle body in accordance with an elapsed time, calculating means for calculating an extreme value of the shock value and generating a maximum value and a minimum value of the calculated extreme value, first shock operating means for selecting first operating condition of the absorbing control means when an instantaneous value of the calculating means exceeds a predetermined value, second shock operating means for selecting a second operating condition of the absorbing control means when the maximum value of the extreme value is within a predetermined value, while the first operating condition is effected and a third shock operating means for selecting a third operating condition of the absorbing control means when the maximum value of the extreme value exceeds a predetermined value, while the second operating condition is effected.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
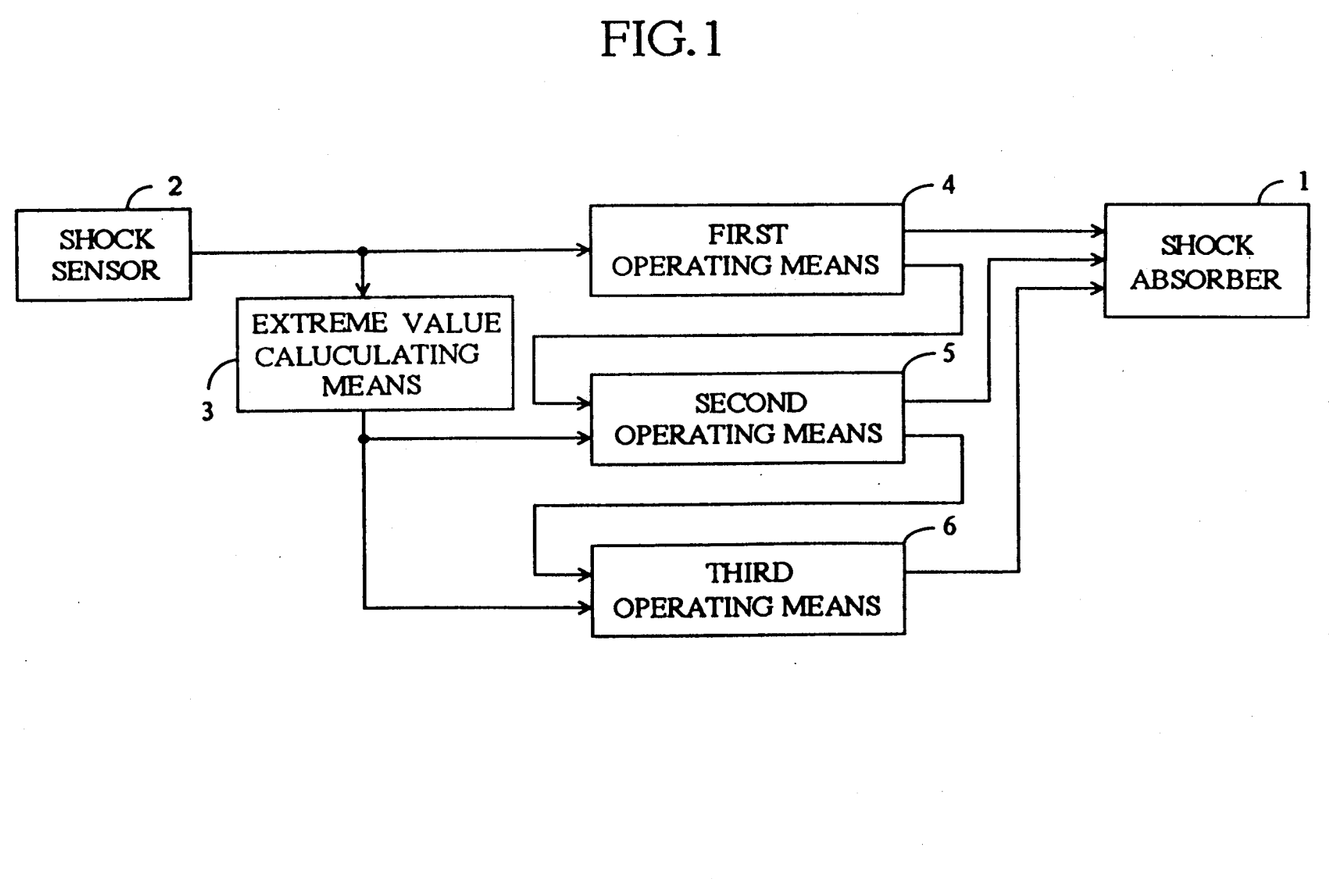
FIG. 1 is a block diagram showing the basic organization of the system.

The block diagram of FIG. 1 shows the basic relationships of the shock absorbing system according to the present invention. The shock absorber 1 is operated in response to a shock sensor 2 which provides a shock value signal to an extreme value calculating means 3 and a first operating means 4. The output of the calculating means 3 is supplied to the second and third operating means 5 and 6 which are operatively interconnected with the first operating means 4 for controlling the shock absorber 1.

Figure 2:
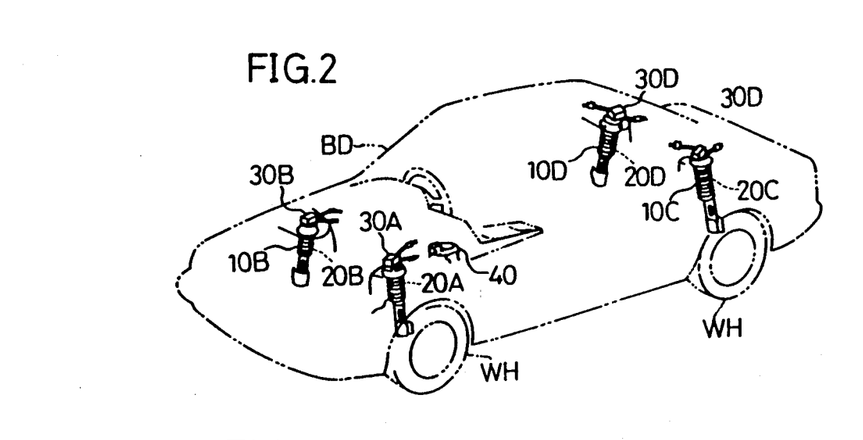
FIG. 2 is a phantom view showing a vehicle shock absorbing system of this invention is association with a vehicle.

A vehicle body BD as shown in FIG. 2, is equipped with a plurality of coil springs 10A, 10B, 10C and 10D, a plurality of shock absorbers or absorbing control means 20A, 20B, 20C and 20D, a plurality of shock sensors (or shock sensing means) 30A, 30B, 30C and 30D and an electronic control unit (ECU) 40. Each of the shock sensors 30A-30D detects a shock applied to a vehicle body BD when the vehicle is running. Control signals are provided by each of the shock sensors 30A-30D and the control signals are supplied to the common ECU 40. The ECU 40 controls the shock absorbers in accordance with the control signals which are produced by the shock sensors 30A-30D, as will be detailed later.

Each of the coil springs 10A-10D is disposed between a corresponding wheel WH and the vehicle body BD. The coil springs 10A-10D elastically support the vehicle body BD. The shock absorbers 20A-20D are arranged between the respective wheels WH and the vehicle body BD and the shock absorbers 20A-20D pass through the respective coil springs 10A-10D. The shock absorbers 20A-20D absorb respective vibrations of the coil springs 10A-10D.

Figure 3:
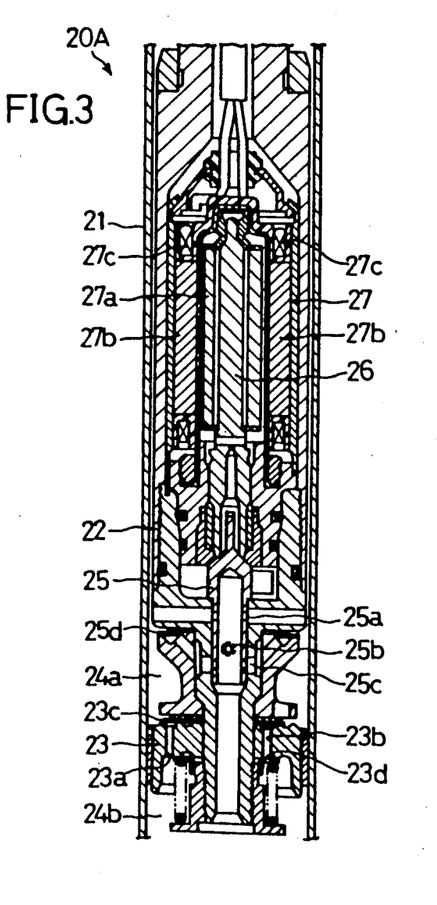
FIG. 3 is a cross sectional view of a shock absorber according to the present invention.

FIG. 3 represents a cross sectional view of one of the shock absorbers 20A-20D. The shock absorber 20A basically includes a cylindrical housing 21, as piston rod 22 and a piston 23. The piston rod 22 is slidably mounted in the cylindrical housing 21. The piston 23 is fixed to an outer surface of a lower portion of the piston rod 22. The piston 23 is slidably mounted in the cylindrical housing 21 in a fluid tight manner. The piston 23 divides the cylindrical housing into two fluid chambers, a first fluid chamber 24a and a second fluid chamber 24b.

The first fluid chamber 24a and the second fluid chamber 24b communicate with each other via conduits 23a and 23b and check valves 23a and 23d. A rotary valve 25 is arranged between the first fluid chamber 24a and the second fluid chamber 24b, for adjusting the fluid-flow therebetween. The rotary valve 25 includes orifices 25a, 25b and 25c (hereinafter denoted simply as 25a-25c). The orifices 25a-25c have different diameters. The rotary valve 25 is rotatably connected with the inner portion of the piston rod 22. One of the orifices 25a-25c is selected in accordance with the operation of the rotary valve 25, for establishing suitable fluid communication between fluid chambers 24a and 24b.

Figure 4:
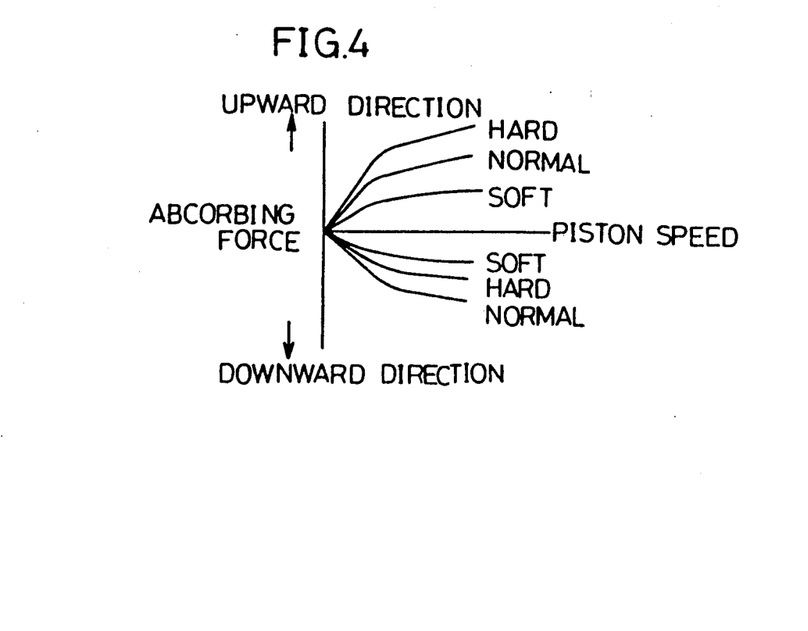
FIG. 4 is a graph showing the operation of the embodiment shown in FIG. 3.

Each of the above mentioned shock absorbers 20A-20D produces a characteristic curve as shown in FIG. 4. The operating condition of each shock absorber 20A-20D is optionally changed in accordance with the selection of one of the orifices 25a-25c. Each shock absorber 20A-20B provides three different stages on the operating conditions. The three operating conditions are HARD (a second operating condition), NORMAL (a third operating condition) and SOFT (a first operating condition) which correspond to the largest diameter orifice, the smallest diameter orifice and the middle diameter orifice, respectively. The upward direction in FIG. 4 represents the expanding direction of each of the shock absorbers 20A-20D, and the downward direction in FIG. 4 represents the contracting direction. The absorbing force of the expanding direction is larger than the absorbing force of the contracting direction.

The rotary valve 25 is driven by an electromagnetic actuator 27 via shaft 26. The shaft 26 is rotatably enclosed in the inner portion of the piston rod 22 and the lower portion of the shaft 26 is operatively connected to the upper portion of the rotary valve 25. The electromagnetic actuator 27 basically includes a permanent magnet 27a, a plurality of yokes 27b and 27b and a plurality of electromagnetic coils 27c and 27c. The permanent magnet 27a is fixed to the outer surface of the shaft 26. The yokes 27b and 27b are fixed to the inner portion of the piston rod 22 so as to enclose the permanent magnet 27a and the yokes 27b and 27b are made of electromagnetic material. The electromagnetic coils 27c and 27c are wound around the yokes 27b and 27b. When a current is supplied to the electromagnetic coils 27c and 27c, an electromagnetic force is generated. When the electromagnetic force is generated, the rotary valve 25 and the shaft 26 adjust the absorbing force in the shock absorbers 20A-20D.

Figure 5:
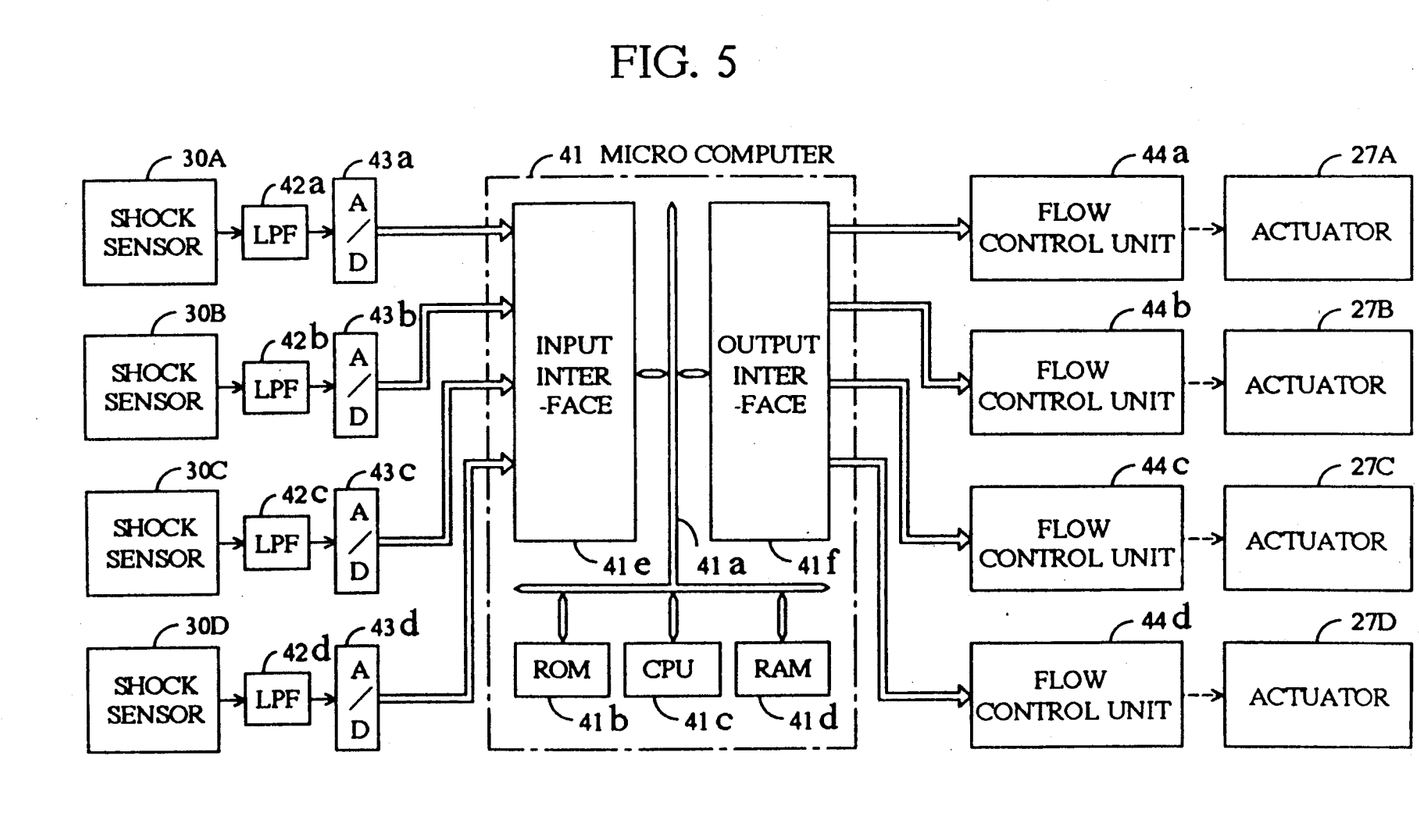
FIG. 5 is a block diagram showing the controlling system of the present invention.

The shock sensors 30A-30D are arranged between the shock absorbers 20A-20D and the vehicle body BD, respectively. (See FIGS. 2 and 5) Each of the shock sensors 30A-30D basically includes piezo type load devices (not shown). Each of the shock sensors 30A-30D detects the shock value which is applied to the vehicle body BD from a road condition and an analogue signal is produced in direct proportion to the shock value. The shock sensors 30A-30D can be replaced with acceleration sensors (not shown). An acceleration sensor is disclosed in Japanese Kokai No. 61-57414 which can detect acceleration in the vertical direction.

The ECU 40 includes a micro computer 41. The micro computer 41 controls the operating condition of the shock absorbers 20A-20B in accordance with the detecting signals from the shock sensors 30A-30D. The micro computer 41 includes a read-only memory (ROM) 41b, a central processing unit (CPU) 41c, a random access memory (RAM) 41d, an input interface 41e, an output interface 41f and a bus 41a. ROM 41b stores a processing program which controls operations of the shock absorbers 20A-20D. The details of the processing program are disclosed in FIGS. 6A and 6B. The shock sensors 30A-30D are connected with the input interface 41e via low pass filters 42a-42d and analogue-digital modulators 43a-43d. The low pass filters 42a-42d exclude high range noises from the detected signals from the shock sensors 30A-30D. The analogue-digital modulators 43a-43d transform the analogue signals from the shock sensors 30A-30D into digital signals which are supplied to the input interface 41e. The output interface 41f is connected with a plurality of electromagnetic actuators 27A-27D via a plurality of electronic flow control units 44a-44d, respectively. Each of the electromagnetic actuators 27A-27D is similar to the electromagnetic actuator 27 which is arranged in each of the shock absorbers 20A-20D (see FIG. 3) in construction and function. The electromagnetic actuators 27A-27D are controlled in accordance with the HARD, NORMAL and SOFT operating signals.

Figure 6A:
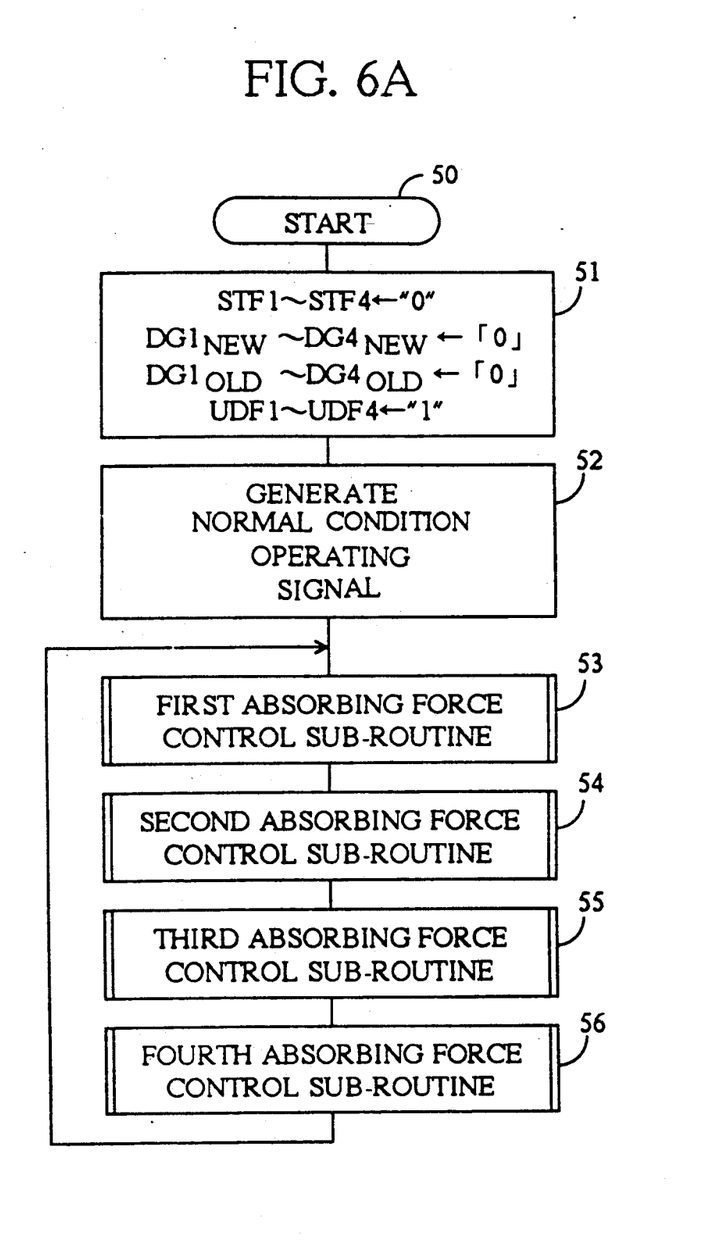
FIG. 6A is a main flow chart showing a process performed by the present invention.

The operation of the shock absorbing system according to the foregoing embodiment of the present invention will be detailed hereinafter with reference to FIGS. 6A and 6B.

When an ignition switch (not shown) is turned on, the CPU 41c begins to execute the program in step 50. State flags STF1-STF4, new detected shock forces $DG1_{NEW}$-$DG4_{NEW}$ and old detected shock forces $DG1_{OLD}$-$DG4_{OLD}$ are initialized "0"s state/ Up-down flags UDF1-UDF4 are initialized "1"s state. The state flags STF1-STF4 represent the operating condition of the shock absorbers 20A-20D. While the operating condition is "0" state, each of the shock absorbers is operated under NORMAL condition. While the operating condition is "1" state, each of the shock absorbers is operated under SOFT condition. While the operating condition is "2" state, each of the shock absorbers is operated under HARD condition. The new detected shock forces $DG1_{NEW}$-$DG4_{NEW}$ represent present shock force value of the shock sensors 30A-30D, respectively. The old detected shock forces $DG1_{OLD}$-$DG4_{OLD}$ represent former shock force value of the shock sensors 30A-30D. Each of the up-down flags UDF1-UDF4 determines the up or down control condition of each of the shock absorbers 20A-20D. The state "1" represents a rising operating condition of each of the shock absorbers 20A-20D. On the contrary the state "0" represents a descending operating condition of each of the shock absorbers 20A-20D.

In step 52, the NORMAL condition operating signal is generated by the CPU 41c, and the operating signal is supplied to the electronic flow control units 44a-44d respectively via the common output interface 41f. The electromagnetic actuators 27A-27D are operated in accordance with the output signals of the perspective electronic flow control units 44a-44d and simultaneously brings the rotary valves 25 into NORMAL condition.

After the initializing steps 51 and 52, the CPU 41c executed the steps 53 through 56. These steps 53, 54, 55 and 56 represent first, second, third and fourth absorbing force control sub-routines, respectively. The sub-routines 53 through 56 control the respective shock absorbers 20A-20D. The shock absorbers 20A-20D are controlled in accordance with the output signals of the shock sensors 30A–30D. The steps 53 through 56 are the same in the execution or process. The following explanation eliminates the disclosure of steps 54 through 56 and only disclose the first absorbing force control sub-routine 53.

Figure 6B:
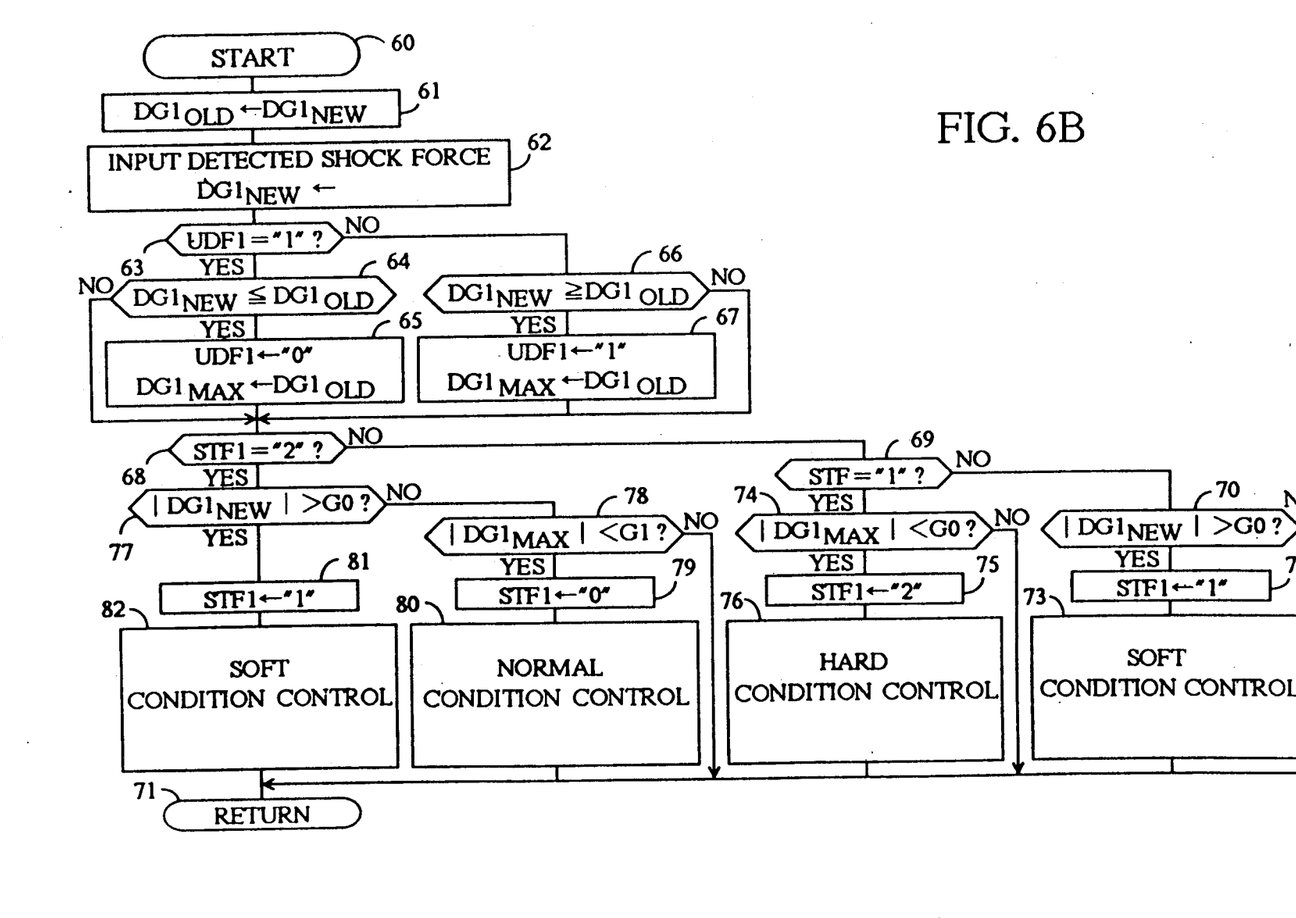
FIG. 6B is a sub-routine flow chart showing a process performed by FIG. 6A.

FIG. 6B represents a flow chart of the first absorbing force control sub-routine 53.

In step 60, the beginning of an execution of the program is defined.

In step 61, the newest detected shock force $DG1_{NEW}$ is transferred to the old detected shock force $DG1_{OLD}$.

In step 62, the detected signal at the shock sensor 30A is transferred to micro computer 41 via low pass filter 42a, analogue-digital modulator 43a and input interface 41e, and deemed as the newest detected shock force value $DG1_{NEW}$. The former detected shock force value $DG1_{OLD}$ represents a former shock value to the vehicle body BD.

The program detects, during its execution ranging from step 63 through step 67, whether the shock force which has been detected by the shock sensor 30A is in the rising condition or descending condition and calculates, by using the resulting condition, an extreme value $DG1_{MAX}$ (maximum value and minimum value) of the detected shock force. In detail, in step 63 it is determined whether the flag UDF1 is in "1" or not. "1" represents a rising condition and "0" represents a descending condition of the shock absorber 20A. If the detected shock force DG1 is still in the rising condition, step 64 and step 65 are performed in turn. On the contrary, if the detected shock force DG1 is still in a descending condition, step 66 and step 67 are successively performed.

In step 64, whether or not the presently detected shock force DG1 is changed toward the descending direction is checked by confirming that $DG1_{NEW}$ is equal to or smaller than $DG1_{OLD}$. If the result of the confirmation is negative or the detected shock force DG1 is still in the rising condition, the execution of the program is jumped to step 68. If the result of step 64 is positive, which designates that the detected shock force DG1 is changed into the descending condition, step 65 is executed. In step 65, the flag UDF1 is set to be "0" and the formerly detected shock force $DG1_{OLD}$ is deemed to be the extreme value $DG1_{MAX}$. In step 65, the extreme value $DG1_{MAX}$ represents the maximum value.

In step 66, whether or not the presently detected shock force DG1 is changing toward the rising condition is checked by confirming the $DG1_{NEW}$ is equal to or larger than $DG1_{OLD}$. If the result of step 66 is negative or the detected shock force DG1 is in the descending condition, the execution of the program is jumped to step 68. If the result of step 66 is positive which designates that the detected sock force DG1 has changed into the rising condition, step 67 is executed. In step 67, the flag UDF1 is set to be "1" and the formerly detected shock force $DG1_{OLD}$ is deemed to be the extreme value $DG1_{MAX}$.

In step 67, the extreme value $DG1_{MAX}$ represents the minimum value.

In steps 68 and 69, the present condition of the shock absorber 20A is checked by confirming if the condition of the state flag STF1 is "2" or "1". If the result of step 68 is negative, the program executed step 69. If the result of step 68 is positive, the program executes step 77. If the result of step 69 is negative, the program executed step 70 (first shock operating means). If the result of step 69 is positive, the program executed step 74 (second shock operating means).

If the condition of the STF1 is "0", an absolute newest detected shock force value $DG1_{NEW}$ is larger than a predetermined value $G_o$. If the result of step 70 is negative, the execution of the program is jumped to step 71. In accordance with the negative result of step 70, the shock absorber 20A maintains the NORMAL condition. Since the shock absorber 20A is maintained in NORMAL condition, a medium absorbing force is produced or developed therein. If the result of step 70 is positive, steps 72 and 73 will be executed. In step 72, the flag STF1 is set to be "1". A SOFT condition control signal is generated in step 73 and the generated signal is provided to the electronic flow control unit 44a. As a result, the shock absorber 20A is controlled for SOFT condition. Based on the result of step 73, the flag STF1 is set to be "1" and the following program is executed in steps 74, 75 and 76. In step 74, an absolute extreme value $DG1_{MAX}$ is checked by confirming that $DG1_{MAX}$ is smaller than the predetermined value $G^o$. If the result of step 74 is negative, the execution of the program is jumped to step 71. In accordance with the negative result of step 74, the shock absorber 30A maintains the SOFT condition. If the result of step 74 is positive, steps 75 and 76 are executed. In step 75, the flag STF1 is set to be "2". A HARD condition control signal is generated in step 76 and the generated signal is provided to the electronic flow control unit 44a.

Based on the foregoing operation (steps 69 through 76), if step 68 determines a positive result, the program executed step 77. In the condition that the STF1 is "2", an absolute newest detected shock force value $DG1_{NEW}$ is checked by confirming that $DG1_{NEW}$ is larger than a predetermined value $G_o$. If the result of step 77 is negative, the program executed step 78 (a third shock operating condition). In a normal condition, the result of step 77 is negative, so that step 78 is executed. In step 78, an absolute extreme value $DG1_{MAX}$ is checked by confirming if $DG1_{MAX}$ is smaller than the predetermined value $G_1$ ($G_1 < G_o$). If the result of step 78 is negative, the execution of the program is jumped to step 71 and the shock absorber 30A maintains a HARD condition. On the contrary, if the result of step 78 is positive, steps 79 and 80 are executed. In step 79, the flag STF1 is set to be "0". A NORMAL condition control signal is generated in step 80 and the resulting signal is provided to the electronic flow control unit 44a.

If the result of step 77 is positive, the program executes steps 81 and 82. In step 81, the flag STF1 is set to be "1". A SOFT condition control signal is generated in step 82 and the generated signal is provided to the electronic flow control unit 44a.

Figure 7:
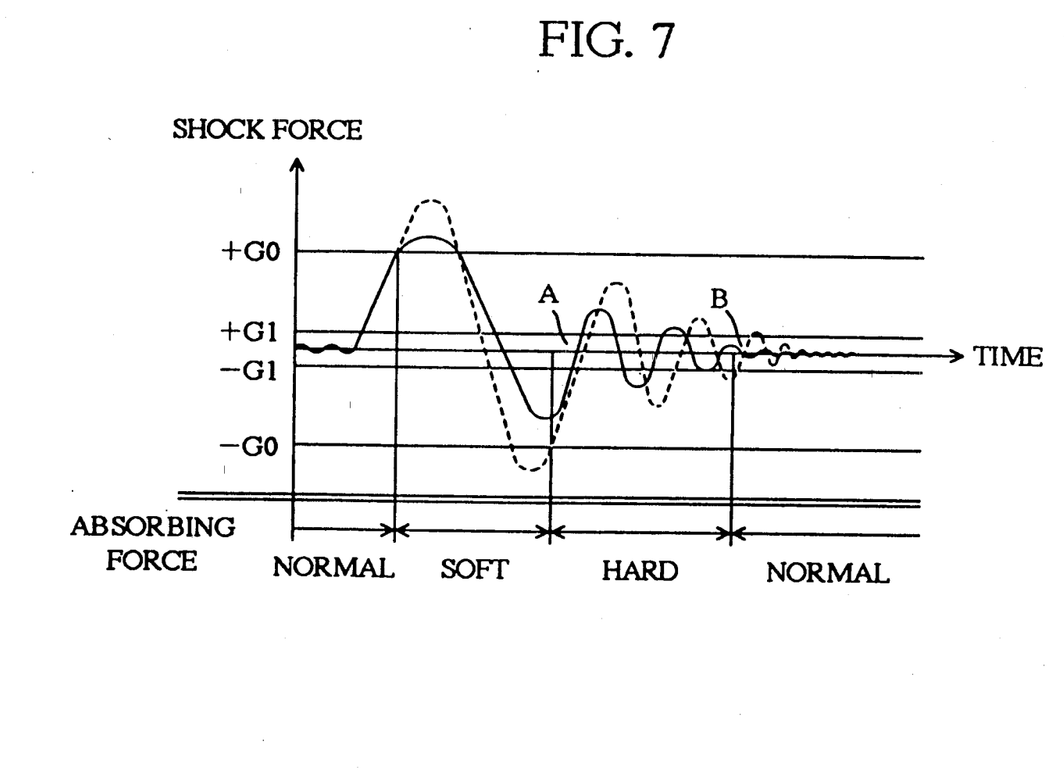
FIG. 7 is a graph showing operations of the present invention and the prior art.

FIG. 7 shows characteristic curves with the solid line showing the characteristic curve of this invention and the dotted line showing the characteristic curve of the prior art.

As described hereinabove, according to the present invention, within a very short time after the vehicle's passage over a projection, the system takes positions NORMAL, SOFT and HARD in turn. Such changes in mode condition can provide a comfortable driving condition and stability in the vehicle driving condition.

The invention has been described in an illustrative manner, and it is to be understood that the terminology which has been used is intended to be in the nature of words of description rather than of limitation.

Obviously, many modifications and variations of the present invention are possible in light of the above teachings. It is therefore to be understood that within the scope of the appended claims, the invention may be practiced otherwise than as specifically described.

What is claimed is:

1. A vehicle shock absorbing system for controlling vibrations of a vehicle, comprising:

absorbing control means disposed between a vehicle body and a wheel, said absorbing control means being operable in at least a first shock condition representing a soft suspension, a second shock condition representing a hard suspension, and a third shock condition representing a normal suspension;

shock sensing means for detecting a chock value applied to said vehicle body;

calculating means for calculating an extreme value of said shock value detected by said shock sensing means, said calculating means generating a maximum value and minimum value of said extreme value;

first shock operating means for selecting the first shock condition of said absorbing control means when a presently detected shock value exceeds a first predetermined value;

second shock operating means for selecting the second shock condition of said absorbing control means when said maximum value of the calculated extreme value is less than the first predetermined value while said first shock condition is selected; and third shock operating means for selecting the third operating condition of said absorbing control means when said maximum value of the calculated extreme value is less than a second predetermined value which is less than the first predetermined value while said second shock condition is selected.

2. A vehicle shock absorbing system according to claim 1, wherein said shock sensing means is directly connected to said first shock operating means.

3. A vehicle shock absorbing system according to claim 1, wherein said shock sensing means is connected to said first and second shock operating means through said calculating means.

4. A vehicle shock absorbing system according to claim 1, wherein said first and second shock operating means are connected to supply an output signal of said first shock operating means to said second shock operating means.

5. A vehicle shock absorbing system according to claim 1, wherein said second and third operating means are connected to supply an output signal of said second shock operating means to said third shock operating means.

6. A vehicle shock absorbing system according to claim 1, wherein said first, second and third shock operating means are connected to said absorbing control means to provide respective output signals to said absorbing control means.

7. A vehicle shock absorbing system according to claim 1, wherein said absorbing control means comprises a plurality of shock absorbers.

8. A vehicle shock absorbing system according to claim 1, wherein said shock sensing means comprises a plurality of piezo type load devices.

9. A vehicle shock absorbing system according to claim 1, wherein said shock sensing means comprises a plurality of acceleration sensors.

10. A vehicle shock absorbing system according to claim 1, wherein said calculating means comprises a micro computer.

* * * * *